United States Patent [19]
Heiligers

[11] Patent Number: 5,971,144
[45] Date of Patent: Oct. 26, 1999

[54] CONTAINER FOR CDS AND OTHER INFORMATION CARRIERS

[76] Inventor: Joennes Hermuns Heiligers, 040 Loosdrechtse D4K 135, Loosdrechte 1231 LT, Netherlands

[21] Appl. No.: 08/726,208

[22] Filed: Oct. 4, 1996

[51] Int. Cl.⁶ .................................................. B65D 85/30
[52] U.S. Cl. .................................. 206/308.1; 206/308.3; 206/232; 211/40
[58] Field of Search ........................... 206/307.1, 308.1, 206/308.3, 309, 312, 477, 478, 232; 211/40

[56] References Cited

U.S. PATENT DOCUMENTS

| | | | |
|---|---|---|---|
| 4,778,047 | 10/1988 | Lay ........................................ | 206/308.1 |
| 4,836,376 | 6/1989 | Posso ..................................... | 206/308.1 |
| 5,027,950 | 7/1991 | Gutierrez et al. ....................... | 206/312 |
| 5,201,414 | 4/1993 | Kaszubinski .......................... | 206/308.1 |
| 5,425,450 | 6/1995 | Lin ......................................... | 206/308.1 |
| 5,477,960 | 12/1995 | Chen ..................................... | 206/308.1 |
| 5,531,322 | 7/1996 | Iwaki et al. ............................ | 206/307 |
| 5,551,560 | 9/1996 | Weisburn et al. ..................... | 206/308.1 |
| 5,593,031 | 1/1997 | Uchida ................................... | 206/309 |
| 5,597,068 | 1/1997 | Weisburn et al. ..................... | 206/308.1 |

FOREIGN PATENT DOCUMENTS

| | | |
|---|---|---|
| 0 608 822 A2 | 8/1994 | European Pat. Off. . |
| 0 420 350 A1 | 4/1997 | European Pat. Off. . |
| 92 15 426 U | 3/1993 | Germany . |
| 2 154 550 | 9/1985 | United Kingdom . |
| WO 97/20315 | 6/1997 | WIPO . |

OTHER PUBLICATIONS

PCT International Preliminary Examination Report, dated Mar. 4, 1998, for PCT/NL96/00459.

*Primary Examiner*—Paul T. Sewell
*Assistant Examiner*—Nhan T. Lam
*Attorney, Agent, or Firm*—Townsend and Townsend and Crew LLP

[57] ABSTRACT

The invention provides a container for at least one information carrier, particularly for CDs. Each information carrier has opposed major surfaces substantially defining a plane therebetween, and also has an outer edge which includes perimeter portions of both the major surfaces. The container comprises a first cover portion and a second cover portion rotatable relative to the first cover portion between a closed position and an open position. When the second cover portion is in the closed position, the first and second cover portions define a substantially enclosed information carrier storage volume. At least one information carrier holder is disposed within this storage volume, the holder comprising clamping elements on either side of a slot. The slot is capable of receiving a portion of the edge of the information carrier, so that the clamping elements releasably grip the information carrier along each of its major surfaces. Thus, the information carrier is removable from the slot when the cover portion is in the open portion by applying a force substantially along the plane of the information carrier.

13 Claims, 5 Drawing Sheets

CONTAINER FOR CDS AND OTHER INFORMATION CARRIERS

CROSS REFERENCE TO RELATED APPLICATIONS

This application is a continuation-in-part of Netherlands patent application Ser. No. 1001698, filed Nov. 20, 1995, the full disclosure of which is incorporated herein by reference.

BACKGROUND OF THE INVENTION

The present invention provides a container for information carriers, and in one embodiment, provides an integrally moldable CD container with a holder which grips the outer edge of the compact disc so that the disc is easily pulled free from the box by applying a force along the plane of the disc.

Known CD storage container generally include first and second cover portions which are hinged together. The first cover portion generally includes a bottom floor and raised lateral walls so as to form a box. The second cover portion is in the form of a lid which lockingly engages the box. Near the center of the box are circularly arranged clamping elements which project a short distance upward from the floor of the box. When these circularly arranged elements extend through a central opening of the CD, they clamp the CD in place, holding the CD roughly parallel to the bottom floor and within the lateral walls of the box. By locking the lid onto the box, the CD can be stored inside the container and protected from the external environment.

When removing the CD from known CD containers, the lid is pivoted open and the CD is grasped along its peripheral edge. To release the CD from the box, the clamping elements within the central opening are forced inward so that the CD can be retracted in a direction substantially perpendicularly to the box floor. Similarly, the CD is inserted into the box by pressing it down over the central clamping elements, perpendicular to both the box floor and the plane of the disc itself. As the inward deformation of the clamping elements during insertion and removal of the CD is substantially parallel to the plane of the CD and the box floor, and as the clamping elements project perpendicularly from the floor, the clamping elements are generally deformed along the plane of the CD. One such information carrier container is described in European Patent Application No. 0 420 350.

Known containers for CDs and other information carriers have a number of drawbacks. For example, these known devices can generally only store information carriers that have a central opening to receive the circular clamping elements. Additionally, it is often difficult to remove CDs and other information carriers which are held in place by the clamping elements of these known CD boxes. Specifically, there is very little space for grasping the CD along its perimeter edge, as the plane of the CD is quite close to the bottom of the box to minimize the storage volume surrounding the flat CD. Also, it is generally necessary to grasp the carrier with one hand while holding the box with the other. In fact, manual deformation of the central clamping elements often helps to release the CD. Hence, two hands are generally required whenever the information carrier is to be removed. Another disadvantage of known CD boxes is that there is a significant chance that the user will damage the CD by coming into contact with a data bearing portion of the carrier during this removal process. Similarly, both the installation and removal forces applied against the CD are generally normal to the plane of the disc, increasing the possibility that the disc will be bent or broken.

Known CD container structures also suffer from disadvantages from the manufacturer's viewpoint. Known CD boxes are often assembled from several individual pieces, generally of differing, relatively expensive materials. For example, the clamping elements must be sufficiently flexible to be readily pushed aside by the information carrier, but should be sufficiently rigid to clamp the information carrier firmly in place. This combination of requirements substantially limits the selection of suitable materials, particularly when it is desired to form the clamping elements using inexpensive molding techniques. Even when such expensive materials are used, these short stiff clamping elements are generally not sufficiently durable to accommodate long term, repeated use. Furthermore, known boxes are often also formed with molded hinge pins to ease assembly, but these structures are also prone to breakage during use. Should the clamping elements or hinge pins snap off, the CD or other information carrier can no longer be held in place and/or protected from the environment, thereby rendering the container useless. Lastly, once damaged boxes are to be discarded, the use of several individual materials makes recycling the useless container problematic.

For the above reasons, it is desirable to provide improved information carrier containers and methods for their production. It would be particularly desirable to provide containers which held CDs and other information carriers securely and protected them from the environment, but which allowed the information carrier to be removed and reinserted easily and safely throughout the useful life of the information carrier itself.

SUMMARY OF THE INVENTION

In a first aspect, the present invention provides a container for at least one information carrier. Each information carrier has opposed major surfaces substantially defining a plane therebetween, and also has an outer edge which includes perimeter portions of both the major surfaces. The container comprises a first cover portion and a second cover portion which is rotatable relative to the first cover portion between a closed position and an open position. When the second cover portion is in the closed position, the container defines a substantially enclosed information carrier storage volume. At least one information carrier holder is disposed within this storage volume, the holder comprising clamping elements on either side of a slot. The slot is capable of receiving a portion of the edge of the information carrier so that the clamping elements releasably grip the information carrier along each of its major surfaces. Thus, the information carrier is removable from the slot when the cover portion is in the open portion by applying a force substantially along the plane of the information carrier.

Since the clamping elements grip the information carrier along the perimeter edge, the container can be used for storing of information carriers regardless of whether or not they have central openings. Additionally, as the clamping elements grip the information carrier along its major surfaces, the clamping elements need not be subjected to excessive deformation or apply a large load, particularly for the amount of surface being gripped. It will often be desirable to arrange the clamping elements so that they engage an outer perimeter of the information carrier where no data is stored. It is a particular advantage of the clamping orientation of the clamping elements that they may be designed flat so as to extend perpendicularly to their direction of deformation and along the plane of the information carrier. Ideally, the clamping elements will be arranged as a plurality of opposed pairs on opposite sides of the plane of the information carrier so that the force of each clamping element is compensated by its counterpart, thereby avoiding deformation of the information carrier from the clamping force. This durable container will therefore be suitable for reuse, for example, by replacing one disk with another when unsold CDs are returned to a music company.

In another aspect, the present invention provides a data storage system comprising at least one disk-shaped, substantially planar information carrier and a storage container. The information carrier has a pair of major surfaces and a substantially circular outer edge which includes perimeter portions of both of those major surfaces. The storage container comprises a first cover portion and a second cover portion with an intermediate portion rotatably connected to both the first and second cover portions. The intermediate portion has at least one information carrier holder. The information carrier holder includes a plurality of clamping elements releasably gripping a portion of the edge of an associated information carrier along its opposed major surfaces. The second cover portion is rotatable relative to the first cover portion between a closed position and an open position. In the closed position, the first cover portion, the second cover portion, and the intermediate portion substantially enclose the at least one information carrier. When the second cover portion is in the open position, the information carrier is removable from the clamping elements by applying a force substantially along the plane of the information carrier.

In another aspect, the present invention provides a method for storing a CD. The method comprises injection molding an integral CD container having a first cover portion, an intermediate portion rotatably connected to the first cover portion by a living hinge, and a second cover portion rotatably connected to the intermediate portion by a living hinge. Opposed surfaces of the CD are releasably gripped with a plurality of clamping elements of the intermediate portion. The second cover portion is rotated relative to the first cover portion about the living hinges so that the first cover portion, the intermediate cover portion, and the second cover portion substantially enclose the gripped CD.

BRIEF DESCRIPTION OF THE DRAWINGS

FIGS. 5A and B are plan and frontal views of an alternative information carrier container according to the principles of the present invention, in which a plurality of information carriers releasably gripped by a plurality of holders.

DETAILED DESCRIPTION OF THE SPECIFIC EMBODIMENTS

Figures 1, 2:
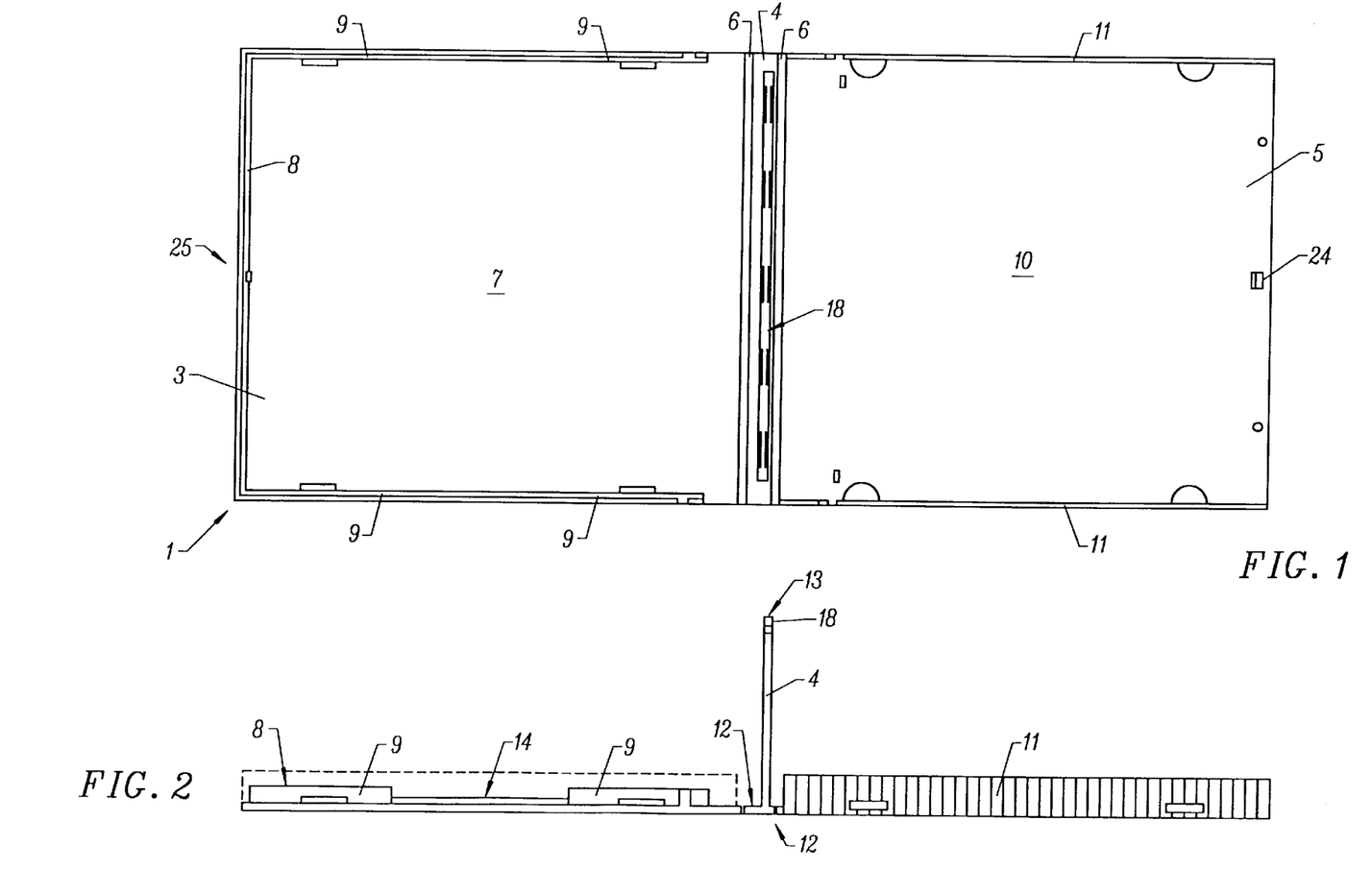
FIG. 1 is a plan view of the information carrier container of the present invention in the open position.
FIG. 2 is frontal view of the container of FIG. 1.
Figure 3:
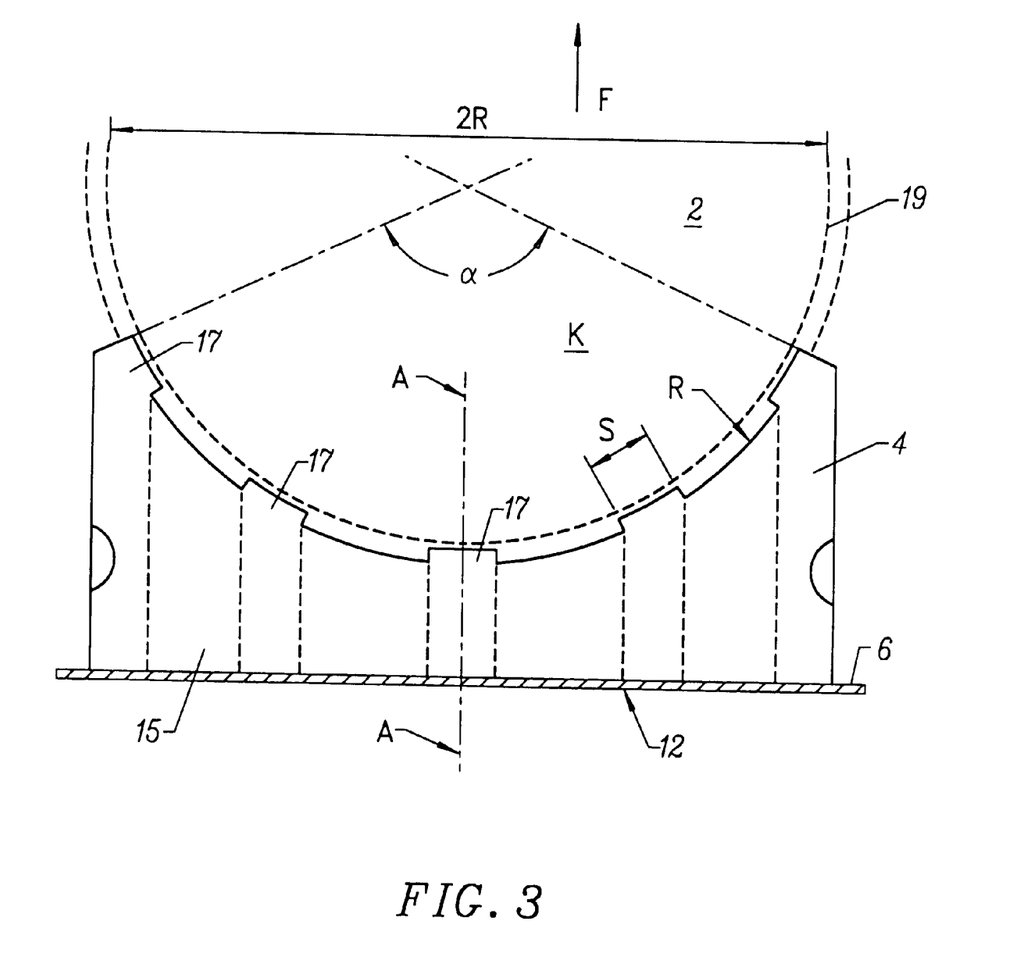
FIG. 3 is a cross sectional lateral view of the container of FIG. 1, showing the substantially circular arc defined by the data holder and the clamping elements used for gripping CDs and other circular information carriers.

Referring first to FIGS. 1–3, an exemplary storage container 1 is particularly advantageous for storing information carriers which are formed as thin disks, including compact discs (CD, CD-i, CD-ROM), video discs, LP's, 45's, and the like. As will be described in more detail hereinbelow, alternative embodiments of the present containers may instead be adapted for storage of information carriers which are substantially rectangular in shape, such as chip-cards, data cartridges, credit cards, magnetic cards, or the like. For convenience, the container of the present invention will generally be described with reference to the storage of CDs. The interaction of the container 1 and a CD 2 is illustrated in FIG. 3.

The container of FIG. 1 can conveniently be constructed as one piece, typically being manufactured using injection molding, ideally from an environmentally safe, recyclable plastic, such as a polypropylene, optionally a random copolymer polypropylene to provide a clear container structure, or a homopolymer which is both clear and lower in cost. Container 1 generally includes a first cover portion 3, an intermediate portion 4, and a second cover portion 5. The closed container will preferably be less than about 135 mm by 130 mm by 9 mm, ideally being about 132 mm by 124 mm by 8 mm, with a total weight of between about 45 and 50 grams.

The first cover portion 3 and the second cover portion 5 are connected to intermediate portion 4 by two integral or "living" hinges 6. These living hinges are typically defined by V-shaped groves, so that a relatively thin bottom portion functions as a deforming element. Living hinges 6 are located near the outer surface of the container in such a way that both cover portions 3, 5 are pivotable about an angle of at least 90 degrees relative to intermediate portion 4. Thus, the cover portions can be pivoted from the substantially flat position shown in FIGS. 1–3 to a closed position, as indicated by the broken lines in FIG. 2.

First cover portion 3 has a substantially planar upper surface that will define a floor 7 of the enclosed storage volume. The first cover portion is provided with a front wall 8 along its longitudinal edge opposite hinge 6, and partial sidewalls 9 which extend along the lateral edges of the floor.

The second cover part 5 also has a substantially planar upper surface 10, and is provided with walls 11 along its lateral edges. When the second cover is in a closed position, walls 11 rest flush against the outside of the partial lateral walls 9, while the upper edge of front wall 8 rests flush against the inside of upper surface 10. A back wall 12 of intermediate portion 4 defines a fourth wall around the rectangular perimeter of the storage container when the second portion is in the closed position, thus rendering the storage container substantially water- and dust-proof, the container ideally being completely water- and dust-proof.

A holder 13 for one or more information carriers extends from intermediate part 4 within an enclosed storage volume 14 of container 1 when the container is in its closed configuration. Any CDs held in holder 13 will also occupy storage volume 14 when the container is closed.

Figure 2A:
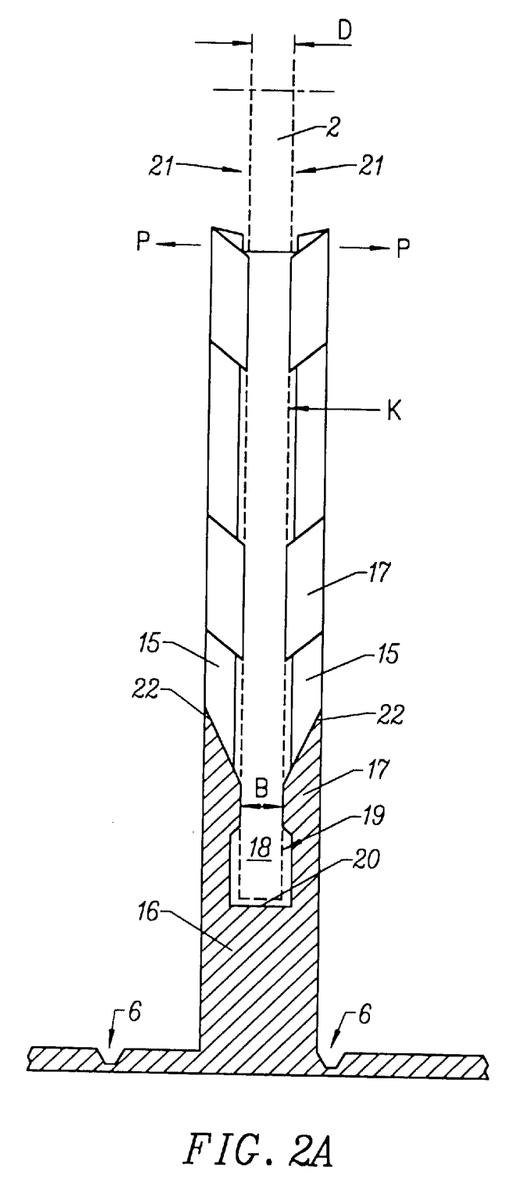
FIG. 2A is an enlarged cross-sectional view of an information carrier holder of the container of FIG. 1.

As best seen in FIG. 2A, holder 13 consists of a pair of spaced apart wall sections 15 linked to one another by cross partitions 16. Located on the inner surface of walls 15 are crenelated clamping elements 17. The clamping elements are preferably disposed in pairs, the members of a pair being disposed opposite one another across a slot 18. The slot has a width B which is slightly narrower than the thickness D of CD 2 being stored within the container. Using this structure, the clamping elements can grip the substantially planar CD along a portion of its peripheral edge. This peripheral engagement enables container 1 to grip information carriers regardless of whether they have a central opening. Because the clamping elements grip the CD on both sides, i.e. against the flat major surfaces of an optical disc, the CD can be securely clamped, and yet can still be easily removed, all without subjecting the clamping elements to excessive deformation.

When inserting a CD, clamping elements 17 (and/or the structure which supports them) are simply deformed slightly outward. Similarly, during removal, the clamping elements slide along the major surface of the information carrier until the latter is completely free, after which the clamping elements resiliently return to their original position. In the exemplary embodiment, intermediate portion 4 presents the slot vertically when the box rests open on a flat surface. This will allow easy insertion and removal of the information carrier using only a single hand.

A particular advantage of the in-plane clamping orientation of clamping elements 17 is that they may be designed to extend perpendicularly to the direction of deformation and along the plane of the CD. This permits clamping elements of a relatively wide, flat design which extend along an edge of the CD in the plane of the CD. This peripheral edge of the major surfaces provides a substantial surface area to be gripped by the clamping elements, and the clamping elements are able to grip these large surfaces from opposite directions. These features help the clamping elements to hold the information carrier securely in place with relatively little clamping force per clamping element, and also per unit of surface area being clamped. This also significantly limits the required deformation of the clamping elements, thereby enhancing their durability.

Preferably, the portion of CD 2 engaged by clamping elements 17 is free of data, the clamping elements generally engaging the outer edge of the CD radially beyond the stored data, to avoid any loss of data which might result when the clamping elements slide across the CD surface.

As can be seen most clearly in FIG. 3, storage of disk-shaped information carriers such as CDs will preferably make use of holders having a slot which extends along a circular segment. Slot 18 optionally has a radius R which is approximately equal to the radius R of the circular information carrier being stored. The circular segment typically encompasses an angle α of less than 180 degrees. Angle α is often between about 60 and 150 degrees, here being about 120 degrees. Generally, maximizing slot length helps to provide efficient clamping force, while the width of holder 13 on intermediate part 4 should be kept significantly less than the diameter of the information carrier being gripped.

Mounting a series of clamping elements along the slot is advantageous in that the information carrier is gripped at multiple points. In the embodiment shown in FIG. 3, five pairs of clamping elements 17 are used to firmly grip the CD. Alternative numbers of clamping elements are feasible; even one pair of clamping elements is sufficient, particularly where these clamping elements extend the entire length of slot 18. It should be noted that slot 18 need not extend continuously along the edge of CD 2 (See FIG. 7B).

The clamping elements are preferably not unduly rigid. Relative to the direction of the slot, they are comparatively short, allowing the use of relatively soft materials to minimize damage to the CD being gripped. There is substantial latitude in the design of the support for the clamping elements, allowing the deformation characteristics and the gripping force to be optimized to securely hold the CD without imposing large localized forces on the clamping element support structure. Positioning pairs of clamping elements opposite one another offers the advantage that they do not deform information carrier therebetween, since the force against the CD by each clamping element is compensated by the pressure from the counterpart clamping element of the pair.

Figure 4:
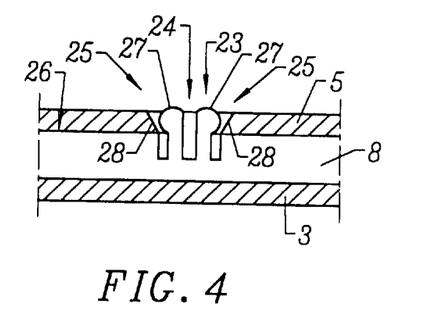
FIG. 4 is an enlarged cross sectional view of a walking mechanism with the container of FIG. 1.

Referring now to FIG. 4, the containers of the present invention are optionally locked in a closed configuration using a locking mechanism 23. Locking mechanism 23 is generally disposed opposite the hinges near the edge of upper surface 10 (see FIG. 1), and here includes an opening 24 in the second cover portion 5 and two latch elements 25 molded into the surface of front wall 8 of first cover portion 3. Latch elements 25 are positioned so as to enter opening 24 when the container is in a closed configuration.

The latch elements extend parallel to one another a slight distance above an upper edge 26 of front wall 8. The upper side of the latch elements are provided with guide surfaces 27, and the width of opening 24 allows the guide surfaces to enter when the latch elements are lightly squeezed together. Inner surfaces 28 of opening 24 slope upwardly and outwardly such that the opening is larger on the outer surface of the container than on the inside. Hence, once the guide surfaces are past the relatively narrow portion of opening 24, the latch elements are able to expand resiliently outward, returning toward their original positions. This securely latches first cover portion 3 to second cover portion 5.

Locking mechanism 23 may be located adjacent the front edge, or in either or both of the lateral walls. Optionally, the container may include a plurality of locking mechanisms. A wide variety of alternative locking mechanisms may be used in combination with, or instead of, the particular embodiment shown here. Advantageously, locking mechanism 23 is inexpensive to manufacture during the injection molding process, and requires no additional fabrication steps. Additionally, unlatching locking mechanism 23 is a simple matter.

Figures 5A, 5B:
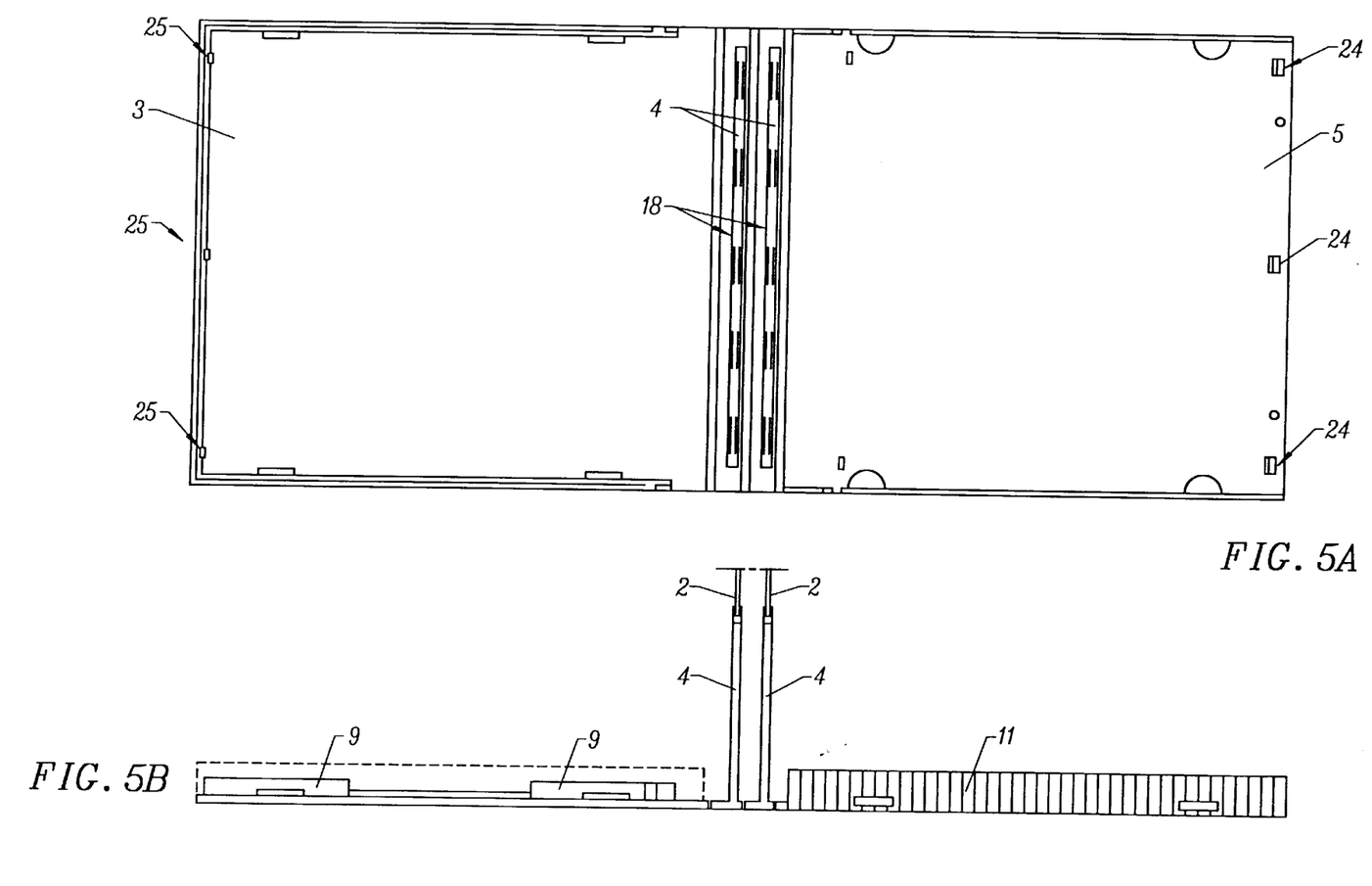

FIG. 5 shows an alternative embodiment of the CD container having a pair of intermediate portions 4. The intermediate portions are rotatably connected with each other, and with the first and second cover portions 3, 5, to allow storage of two CDs within the container volume. Since both intermediate portions are rotatable with respect to one another, it is possible to grip either information carrier without obstruction from the other information carrier, or from the first or second cover portions. Similarly, it is possible to incorporate multiple intermediate portions side-by-side to provide storage for multiple CDs. An advantage of the parallel arrangement of the information carriers of the embodiment of FIG. 5 is that both information carriers can be inserted into the container in an economical and efficient loading process.

It is a particular advantage of the container of the present invention that access is provided to both of the major surfaces of the CD while the CD is securely held within the clamping elements. Optionally, the CD may be grasped along its major surfaces during insertion and/or removal, preferably at locations which are free of data, but in any case, in a manner which would avoid damage. Access to these major surfaces significantly facilitates the application of insertion and removal forces. An additional advantage is that the CD is visible from both sides while held by the clamping elements, so that text on either side of the information carrier is open to view.

Alternatively, a finger or mechanical grasping mechanism may be extended through the central opening of the CD during insertion and/or removal of the CD from the clamping elements. This helps to avoid contact between the user (or an automated load and/or unload mechanism) and the portion of the CD on which data is stored, without significantly complicating handling of the CD. This aspect of the present invention may facilitate automated transfer of a CD (or other information carrier) between a CD player (or some other data storage or retrieval device) and a closed container, so that the entire container can be introduced into the CD player (or other device) as an enclosed data cartridge.

Figure 6:
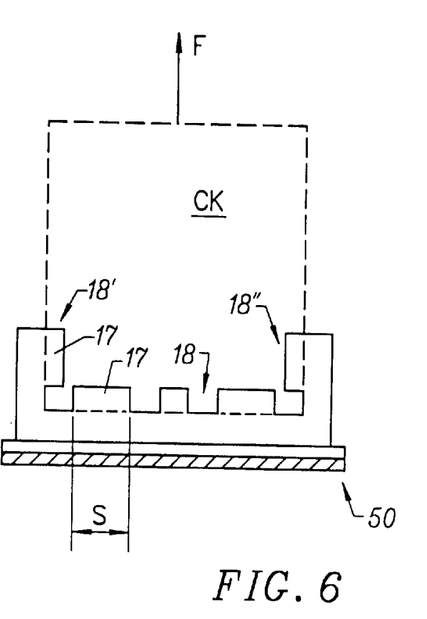
FIG. 6 is a cross sectional lateral view of an information carrier holder similar to the container of FIG. 1, in which the holder of the container is suitable for substantially rectangular shaped information carriers.

Referring now to FIG. 6, an alternative container 50 for rectangular information carriers has a slot 18 which extends along three sides of a rectangular information carrier CK (the outline of which is indicated in the drawing by broken lines). Three pairs of clamping elements 17 are disposed along a first portion of slot 18 which substantially follows the edge of the rectangular information carrier closest to hinges 6. Two slot sections 18' are disposed perpendicularly to that first portion, each having only one pair of clamping elements. Such rectangular information carrier containers are particularly well suited for storing chip-cards, credit cards, magnetic cards, discs contained in cartridges, and the like. Advantageously, no central passage is required through these information carriers to allow them to be securely supported within the container, and both major surfaces of the rectangular information carrier are accessible when the containers are in an open configuration, as the holder again extends from an intermediate portion rotatably connected to both the first and second cover portions. Once again, a plurality of intermediate portions, each having an individual information carrier holder, may be provided.

When a plurality of intermediate portions are provided, it is preferable that both cover portions are rotatably connected to the adjacent intermediate portion, while the intermediate portions are ideally also coupled by living hinges or some other rotatable mechanism. In this way, it is possible to pivot the cover portions on either side of the intermediate portions away from the information carrier, leaving it free for access from both of its major surfaces. In a particularly advantageous embodiment, both cover parts are pivotable about approximately the same plane, allowing the outer surfaces of these cover portions to be spread out over a flat surface. As can be understood with reference to FIGS. 2 and 5B, the outer surface of the intermediate portion will ideally extend along the plane of that flat surface upon which the open storage container is placed.

By properly supporting the holder from the intermediate portion, the information carrier can easily be inserted or removed from such an open container with a single hand, while the storage container also provides an attractive manner of displaying its contents. In fact, the living hinges can provide resilient centering of intermediate portion 4 between the open cover portions, so that, for example, when the CD box is held open at an angle of 60 degrees in one hand, the CD will be roughly half-way between the covers for easy access by the other hand. Optionally, one or both of first and second cover portions 3, 5 may include a support element which engages the outer edge of the information carrier when the container is in the closed configuration. Furthermore, the cover portions may easily be provided with structures for holding labels, libretto's, and other texts, either within the storage volume or on the external surfaces of the container.

It is a particular advantage of the containers of the present invention that they can be manufactured in a single process step. By avoiding assembly of several independent components, an efficient and economical manufacturing process is achieved, even in comparison with other fully automated fabrication systems. Moreover, linking mechanisms such as hinge pins, which are prone to breakage during use, are eliminated. A further advantage of the container of the present invention is that it is made of entirely one kind of material, making it unnecessary to separate out various assembled parts to allow recycling.

In the method of the present invention, a storage container is prepared in an injection molding apparatus in a single fabrication process step. The storage container is fed to a wrapping line, in which the first and second cover portions 3, 5 rest flat on a transport belt. Intermediate portion 4 will also extend along the transport belt, presenting the holder 13 in a substantially vertical orientation.

A CD (or other information carrier) is inserted into holder 13 by pressing a longitudinal edge of the CD downward between clamping elements 17. The CD will typically be pushed down toward a bottom 20 of slot 18, deforming the clamping elements 17 outward and thereby generating a clamping force against the flat major surfaces 21 of the CD (See FIG. 2A). Preferably, the clamping elements include beveled edges 22 which slope inwardly and downwardly, so that the clamping elements deform outwardly whenever the CD is inserted.

As described above, the slot is preferably of such a depth that the clamping elements do not come into contact with data bearing portion K of the CD (See FIG. 3). Once the CD is inserted, booklets or other similar text may be inserted into appropriately designed holder structures of the cover portions.

Preferably, clamping elements 17 are deformed in only one direction P, substantially perpendicularly away from the major surfaces of the CD, as illustrated in FIG. 2A. As used herein, deformation of the clamping elements includes deformation of any structure of the holder which supports them, and which results in movement of clamping elements in a resilient manner. Advantageously, clamping elements 17 may be of virtually any width S. Generally, the desired clamping force can be achieved regardless of variations in the information carrier thickness, the clamping force easily being adjusted by varying the height of the clamping elements 17. Because wall sections 15 are spaced apart from one another, significant variations in the wall thickness of the container should be avoided. Additionally, difficulties in removing the container from the mold can be avoided, thus producing, from an injection molding stand point, a container of relatively simple design.

Once the CDs and any desired text are in place, cover parts are rotated relative to each other into the closed configuration, and the one or more locking mechanisms 23 are engaged. Stickers or printed materials may be placed on the outer surface of the container, either before or after the container is loaded. Once the container is loaded and labeled, it is ready for distribution and use.

Optionally, material may be imprinted in relief in the inner or outer surfaces of the container. In some embodiments, in-mold labeling may be used, in which the mold is designed to accept leaflets of a compatible material, typically comprising polypropylene, the mold ideally keeping the leaflets in place with a vacuum system. The mold is then closed and the container is injection molded so that the leaflet is integrated into the container. This process is facilitated by the structure of the present container, in which the outer surfaces of the cover portions and intermediate portion are molded as a continuous, substantially planar surface.

The user may open the closed and loaded container by simply pivoting the covered parts away from each other. The one or more locking mechanisms 23 will preferably automatically unlatch as the guide surfaces force the latch elements toward each other. Pivoting first cover portion and second cover portion aside provides access to the intermediate portion and its holder, in which the CD is gripped.

The information carrier will preferably be grasped by the user on its opposing major surfaces and pulled out of holder 13 by exerting a force F in a direction opposite slot 18 along the plane of the information carrier CK (See FIG. 6). Once the information carrier is removed, clamping elements 17 return resiliently to their original position. The information carrier may then be returned to the storage cassette by simply following the above steps in reverse order.

Figure 7A:
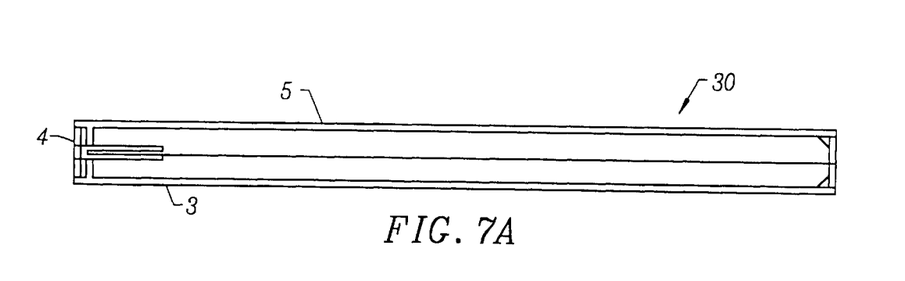
FIGS. 7A–C illustrates an alternative information carrier container having clamping elements disposed on a plurality of holders for gripping a single CD, according to the principles of the present invention.
Figure 7B:
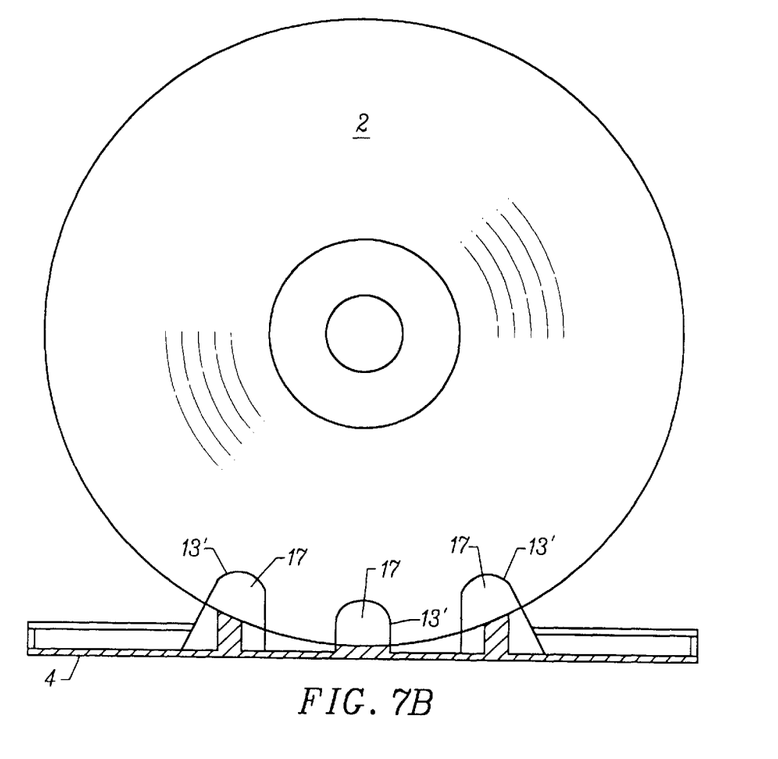
Figure 7C:
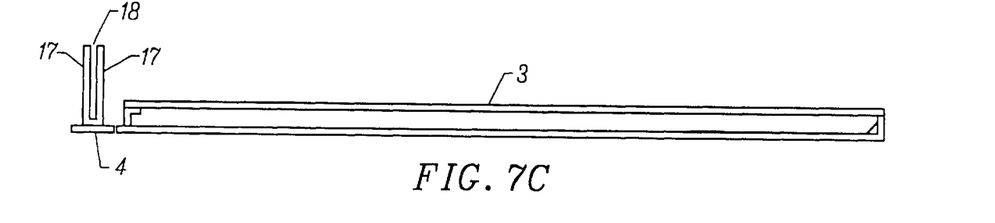

An alternative embodiment of the present container 30 is shown in FIGS. 7A–C. In this embodiment, clamping elements 17 are formed on three separate holders 13', which are again affixed to intermediate portion 4. This allows a single leaflet (with holes corresponding to holders 13') to extend from first cover portion 3 to second cover portion 5 within the container, the leaflet ideally extending across most of the major surfaces of the two cover portions and the intermediate portion. This single large leaflet will reduce the need to include multi-page booklets within the box, and may optionally be read through a clear container material. Information identifying the CD will often be visible on the leaflet through the outer surface of the intermediate portion 4, such as the artist's name, etc., which is particularly advantageous for identifying a CD from a large number of CDs which are stored side-by-side. The smaller, separate holder structures may also reduce shrinkage of the container material, facilitating injection molding in large runs with short cycle times. Optionally, the opposed clamping elements may be fixed to each other by small pins formed in the mold.

While the exemplary embodiments have been described in some detail, by way of illustration and for clarity of understanding, a wide variety of modifications and alternatives will be obvious to those of skill in the art. For example, each intermediate portion may be fixably mounted with respect to any other intermediate portions, or to one of the first and second cover portions. Additionally, it is feasible to incorporate two or more adjacent slots in a single intermediate part, for example, for storing relatively small information carriers side-by-side. Additionally, other storage container designs are feasible, such as partially round or oval-shaped boxes. Each intermediate portion may be detachably connected to the cover portions in order to allow modifications to the number of intermediate portions as desired. Additionally, the intermediate portion may function as a means for manipulating the information carrier, as well as a component of the storage container. In some embodiments, the holder of the intermediate portion may be designed such that squeezing a portion of wall sections 15 together forces clamping elements 17 apart slightly, allowing the information carrier to be inserted or removed without sliding contact against the clamping elements. A variety of materials may be used in the construction of the container of the present invention, for example, fully bio-degradable plastics, or the cover portions may be formed in whole or in part of transparent, translucent, or opaque materials. A variety of latching and locking mechanisms may be used in the container of the present invention, including mechanisms for securing the intermediate portion to one or both of the cover portions, within the scope of the present invention. Therefore, the scope of the present invention is limited solely by the appended claims.

What is claimed is:

1. A container for at least one disk shaped information carrier, each information carrier having opposed major surfaces defining a plane therebetween and an outer edge which includes perimeter portions of the major surfaces, the container comprising:

a first cover portion;

a second cover portion rotatable relative to the first cover portion between a closed position and an open position, the container defining an enclosed information carrier storage volume when the second cover portion is in the closed position;

at least one intermediate portion which couples the first and second cover portions; and at least one information carrier holder disposed on the at least one intermediate portion and within the storage volume, each holder comprising a plurality of clamping elements disposed on either side of a slot for receiving a portion of the edge of the information carrier, the clamping elements comprising means to releasably engage the information carrier along each of the opposed major surfaces so that the information carrier is removable from the slot by applying a force along the plane of the information carrier when the second cover portion is in the open position;

wherein the first cover portion, the second cover portion, the at least one holder, and the at least one intermediate portion are integrally molded from a single material and wherein each holder comprises a plurality of clamping element pairs, the pairs being separated across an inner surface of the intermediate portion.

2. A container as claimed in claim 1, wherein the at least one intermediate portion is rotatable relative to the first cover portion and relative to the second cover portion.

3. A container as claimed in claim 2, further comprising a plurality of living hinges disposed between each of the first and second cover portions and the intermediate portion.

4. A container as claimed in claim 2, wherein the holder allows access to both of the major surfaces of the information carrier when the information carrier is gripped by the clamping surfaces and the second cover portion is in the open configuration.

5. A container as claimed in claim 1, further comprising a plurality of intermediate portions, each intermediate portion having a holder, the intermediate portions being rotatable relative to each other.

6. A container as claimed in claim 1, wherein the clamping elements are arranged as a plurality of mutually opposing pairs relative to the slot so as to avoid deformation of the information carrier.

7. A container as claimed in claim 6, wherein the clamping elements extend in cantilever along the slot, and wherein the clamping elements deform perpendicularly to the slot when the information carrier is introduced therein.

8. A container as claimed in claim 1, further comprising sidewalls extending along edges of the cover portions, wherein the sidewalls are integrally molded with the cover portions.

9. A container as claimed in claim 1, further comprising a leaflet extending within the storage volume along the first cover portion, the at least one intermediate portion, and the second cover portion, the leaflet having a plurality of openings to accommodate the separated pairs of clamping elements along the intermediate portion.

10. A data storage system comprising:

at least one disk-shaped planar information carrier having a pair of major surfaces and a circular outer edge including perimeter portions of each of the major surfaces;

a storage container comprising:
- a first cover portion;
- a second cover portion; and
- an intermediate portion rotatably connected to the first cover portion and to the second cover portion, the intermediate portion having at least one information carrier holder, each holder including a plurality of clamping elements releasably gripping a portion of the edge of an associated information carrier along the opposed major surfaces, the portion of the edge gripped by the clamping elements comprising an arc segment of less than 180°; wherein each holder comprises a plurality of clamping element pairs, the pairs being separated across an inner surface of the intermediate portion
- a first living hinge disposed between the first cover portion and the intermediate portion and a second living hinge disposed between the intermediate portion and the second cover portion, the first cover portion, the second cover portion, and the intermediate portion being injection molded as a single piece;
- wherein the second cover portion is rotatable relative to the first cover portion between a closed position and an open position, the first cover portion, the second cover portion, and the intermediate portion substantially enclosing the at least one information carrier when the second cover portion is in the closed position, the information carrier removable from the clamping elements by applying a force along the plane of the information carrier when the second cover portion is in the open position.

11. A data storage system as claimed in claim 10, wherein the clamping elements grip a region of the major surfaces of the information carrier which are free of stored data.

12. A data storage system as claimed in claim 10, wherein the arc segment is between 60 and 150°.

13. A data storage system as claimed in claim 10, further comprising an opening in the first cover portion near an edge, wherein the second cover portion comprises two locking elements which are received by the opening of the first cover portion when the second cover portion is in the closed position.

* * * * *